(12) United States Patent
Franco

(10) Patent No.: US 12,397,742 B2
(45) Date of Patent: Aug. 26, 2025

(54) MOTORCYCLE THEFT PREVENTION DEVICE

(71) Applicant: Raymond Delreal Franco, North Las Vegas, NV (US)

(72) Inventor: Raymond Delreal Franco, North Las Vegas, NV (US)

( * ) Notice: Subject to any disclaimer, the term of this patent is extended or adjusted under 35 U.S.C. 154(b) by 358 days.

(21) Appl. No.: 17/412,061

(22) Filed: Aug. 25, 2021

(65) Prior Publication Data

US 2022/0063557 A1 Mar. 3, 2022

Related U.S. Application Data

(60) Provisional application No. 63/070,712, filed on Aug. 26, 2020.

(51) Int. Cl.

| | |
|---|---|
| *B60R 25/04* | (2013.01) |
| *B60R 25/042* | (2013.01) |
| *B60R 25/102* | (2013.01) |
| *B62J 3/14* | (2020.01) |
| *B62J 6/01* | (2020.01) |
| *B62J 6/02* | (2020.01) |
| *B62J 6/022* | (2020.01) |
| *B62J 6/057* | (2020.01) |
| *B62J 6/16* | (2020.01) |
| *B62J 43/30* | (2020.01) |
| *B62J 45/415* | (2020.01) |
| *B62J 50/22* | (2020.01) |
| *B60R 25/10* | (2013.01) |

(52) U.S. Cl.
CPC .......... *B60R 25/042* (2013.01); *B60R 25/102* (2013.01); *B62J 3/14* (2020.02); *B62J 6/01* (2020.02); *B62J 6/022* (2020.02); *B62J 6/057* (2020.02); *B62J 6/16* (2013.01); *B62J 43/30* (2020.02); *B62J 45/415* (2020.02); *B62J 50/22* (2020.02); *B60R 2025/1013* (2013.01); *B60R 2325/306* (2013.01)

(58) Field of Classification Search
CPC ....... B60R 25/04; B60R 25/042; B60R 25/10; B60R 25/102; B60R 2325/306; B62J 3/14; B62J 6/02; B62J 6/022; B62J 43/30; B62J 45/415; B62J 50/22; B62J 2025/1013; B62J 6/057; B62J 6/01; B62J 6/16; B62H 5/20; B62M 7/02
See application file for complete search history.

(56) References Cited

U.S. PATENT DOCUMENTS

| | | | | |
|---|---|---|---|---|
| 3,670,301 | A * | 6/1972 | Douglas .............. | B60R 25/1001 340/638 |
| 4,641,124 | A * | 2/1987 | Davis .................. | B60R 25/1018 340/426.23 |
| 2005/0174238 | A1* | 8/2005 | Foseide .............. | G08B 13/1418 340/568.4 |
| 2006/0082448 | A1* | 4/2006 | Maeda ................ | B60R 25/1004 340/428 |

(Continued)

*Primary Examiner* — Logan M Kraft
*Assistant Examiner* — Johnny H Hoang

(57) ABSTRACT

The present invention is a motorcycle theft prevention system that comprises a tilt switch and a control circuit. After the user installed the present invention, the control circuit stays in the deactivated state until the motorcycle is oriented to a different angle. When the motorcycle is oriented to a different angle, the control circuit activates the horn and light source to warn the user of possible theft.

1 Claim, 5 Drawing Sheets

(56) References Cited

U.S. PATENT DOCUMENTS

| | | | |
|---|---|---|---|
| 2007/0268117 A1* | 11/2007 | Moffett | B62H 5/20 |
| | | | 340/426.2 |
| 2010/0219951 A1* | 9/2010 | Sosa | B60R 25/1004 |
| | | | 340/3.1 |
| 2017/0113747 A1* | 4/2017 | Kim | B62J 45/4151 |
| 2020/0369336 A1* | 11/2020 | Zitt | B62H 5/20 |

* cited by examiner

MOTORCYCLE THEFT PREVENTION DEVICE

CROSS-REFERENCE TO RELATED APPLICATIONS

This application claims priority to U.S. Provisional Application No. 63/070,712 filed Aug. 26, 2020, which is hereby incorporated herein by reference.

FIELD OF THE INVENTION

The present disclosure relates generally to theft prevention. More specifically, the present disclosure describes motorcycle theft prevention device.

BACKGROUND OF THE INVENTION

Many anti-theft systems have already been developed to help prevent theft of motorcycles. There are two conventional anti-theft system methods: a mechanical method and an electronic method. However, in order to completely protect the vehicle from theft in these conventional systems, it is still necessary to research and develop many systems and develop a high-performance theft detection sensor.

The contents of two methods, a mechanical method, and an electronic method, of an automobile anti-theft system currently in practical use will be described below.

1) Mechanical method. This anti-theft system prevents the vehicle from starting easily by fixing the handle bars or wheels of the motorcycle with a fixing device. However, once the fixing device is defeated the motorcycle can easily be operated. Even more, there is also an operational inconvenience of setting the fixing bracket every time the vehicle is parked.

2) Electronic method. The basic principle of this system is that when a motorcycle theft is attempted, various detection sensors in the vehicle detect the theft and activate the alarm device incorporated in the system to deter the theft. Many of these systems are widely available and widely used. However, many detection sensors used in these systems have a wide operation setting range, and malfunctions may occur due to changes in the setting environment, so that an alarm siren will often sound, causing inconvenience to the surroundings.

BRIEF DESCRIPTION OF THE DRAWINGS

Some of the embodiments will be described in detail, with reference to the following figures, wherein like designations denote like members, wherein.

Figure 1:
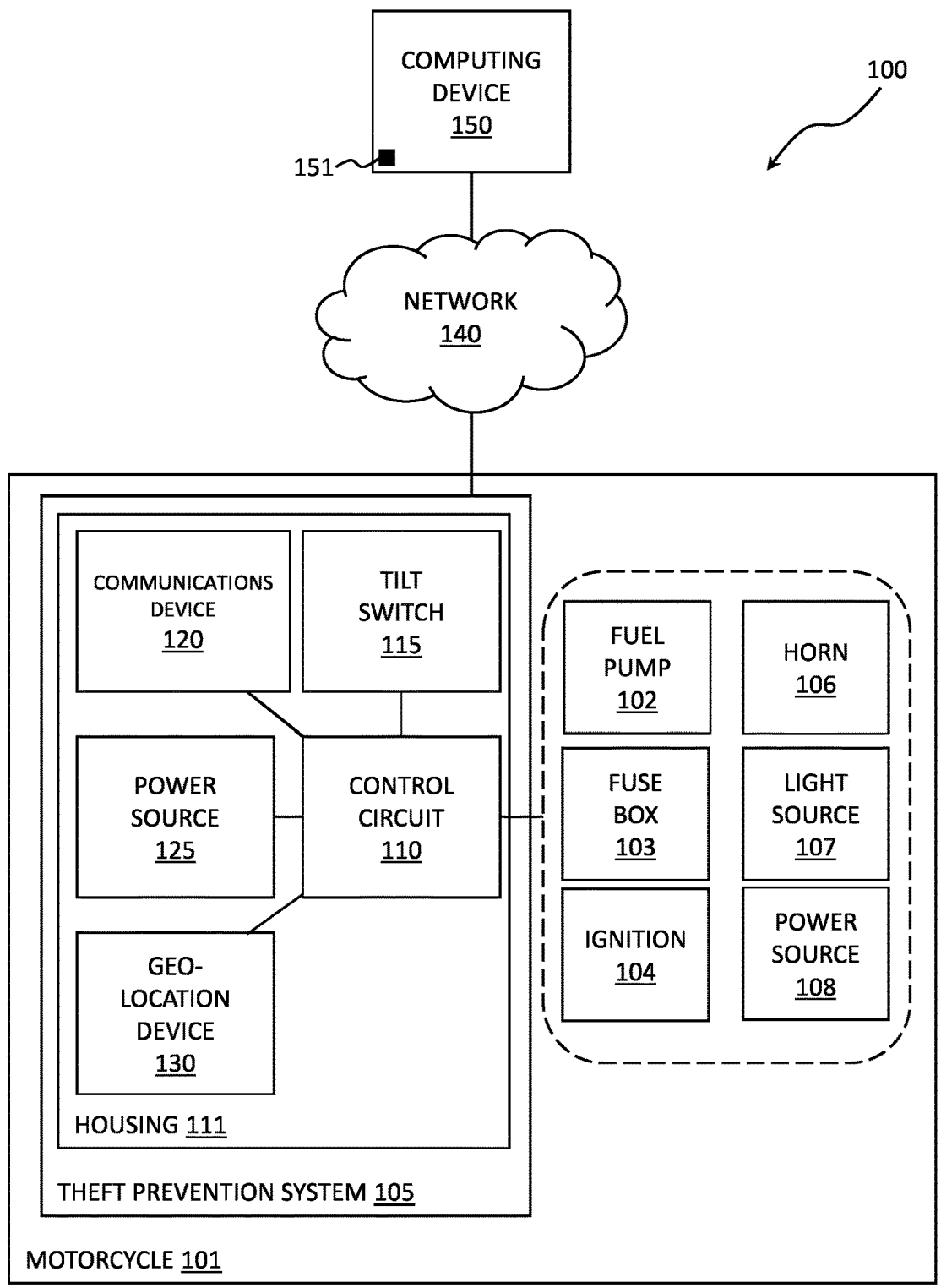
FIG. 1 is a block diagram illustrating a motorcycle theft prevention environment, according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of motorcycle theft prevention devices, embodiments of the present disclosure are not limited to use only in this context.

Many anti-theft systems have already been developed to help prevent theft of motorcycles. There are two conventional anti-theft system methods: a mechanical method and an electronic method. However, in order to completely protect the vehicle from theft in these conventional systems, it is still necessary to research and develop many systems and develop a high-performance theft detection sensor.

The contents of two methods, a mechanical method, and an electronic method, of an automobile anti-theft system currently in practical use will be described below.

1) Mechanical method. This anti-theft system prevents the vehicle from starting easily by fixing the handle bars or wheels of the motorcycle with a fixing device. However, once the fixing device is defeated the motorcycle can easily be operated. Even more, there is also an operational inconvenience of setting the fixing bracket every time the vehicle is parked.

2) Electronic method. The basic principle of this system is that when a motorcycle theft is attempted, various detection sensors in the vehicle detect the theft and activate the alarm device incorporated in the system to deter the theft. Many of these systems are widely available and widely used. However, many detection sensors used in these systems have a wide operation setting range, and malfunctions may occur due to changes in the setting environment, so that an alarm siren will often sound, causing inconvenience to the surroundings. There is a need in the art for electronic theft prevention devices that use robust sensors that have a reduced probability to malfunction.

Embodiments of the instant disclosure will now be described in detail with reference to the figures. FIG. 1 is a block diagram illustrating an environment, generally designated 100, in accordance with some embodiments. Environment 100 includes a theft prevention system 105 and a computing device 150 all interconnected over a network 140. Network 140 can be, for example, a local area network (LAN), a wide area network (WAN) such as the Internet, or a combination of the two, and can include wired, wireless, or fiber optic connections. In general, the network 140 can be any combination of connections and protocols that will support communications between the theft prevention system 105 and the computing device 150.

In various embodiments of the present invention, the computing device 150 may be a laptop computer, tablet computer, netbook computer, personal computer (PC), a desktop computer, a personal digital assistant (PDA), a wearable computing device, a mobile device, a smart phone, or any programmable electronic device capable of communicating with the theft prevention system 105. In general, the computing device 150 is a device that communicates with the theft prevention system 105. The computing device 150 includes a user interface 151. The user interface 151 allows users of the computing device 150 to interact with the theft prevention system 105. The user interface 151 can be a graphical user interfaces. In some embodiments, the user interface 151 is a downloadable mobile application that is associated with the theft prevention system 105.

The theft prevention system 105 is preferably a system that users affix to a motorcycle 101 to prevent theft of the vehicle. In other embodiments, the theft prevention system 105 is affixed to motorcycles (e.g., the motorcycle 101) during the assembly process at the motorcycle manufacturing facility. The motorcycle 101 is preferably a gas- or electric-powered two-wheeled motor vehicle that leans to side and rests on a kickstand when parked and travels upright when in motion. In other words, the motorcycle 101 has a resting angle 300 (e.g., parked) and an active angle 400 (e.g., in motion). The active angle 400 (e.g., about 90-degrees) is greater than the resting angle 300 (e.g., about 45-degrees).

The motorcycle 101 preferably has a horn 106, a light source 107 (e.g., headlights, turn signals, etc.), a power source 108 (e.g., a battery). In embodiments, the motorcycle 101 also includes one or more of a fuel pump 102, a fuse box 103, and an ignition 104. One or more of the horn 106, the light source 107, the power source 108, the fuel pump 102, the fuse box 103, and the ignition 104 can be communicatively coupled to a control circuit of the theft prevention system 105 (e.g., the control circuit 110). One or more of the aforementioned components may be left out of the motorcycle 101 without departing from the spirit and scope of the disclosure.

The theft prevention system 105 includes a housing 111 that can be externally or internally affixed to the motorcycle 101. The housing 111 can be hermetically sealed or waterproof to protect the components included therein. The housing 111 can be made of one or more of a metal, an alloy, a polymer, and a composite. The housing 111 preferably includes one or more of a tilt switch 115, a communications device 120, a power source 125 (e.g., a second power source), and a geolocation device 130 each communicatively coupled to the control circuit 110. The control circuit 110 is configured to execute at least a portion of the steps, processes, methods disclosed in one or more of the embodiments disclose herein. In certain embodiments, the housing 111 includes a power switch on its external surface that is communicatively coupled to the control circuit 110 and used to turn the theft prevention system 105 on and off.

The communications device 120 is a device that transmits data to and/or receives data from (e.g., voice, text, and/or graphical). For example, operational instructions from the computing device 150 can be received via the communications device 120. The power source 125 is a battery known in the art that includes primary cells or secondary cells. The geolocation device 130 is a navigation device known the art that uses one or more of Global Positioning System (GPS) data, cell phone tower data, Wi-Fi access point data to generate geolocation and time data. The tilt switch 115 is a device known in the art that detects orientation or inclination. The tilt switch 115 is preferably a mercury switch. The tilt switch 115 includes an activated state and a deactivated state. The tilt switch 115 is configured to be in the deactivated state when the motorcycle 101 is oriented in the resting angle 300. The tilt switch 115 is configured to be in the activated state when the motorcycle 101 is oriented in the active angle 400.

Figure 2:
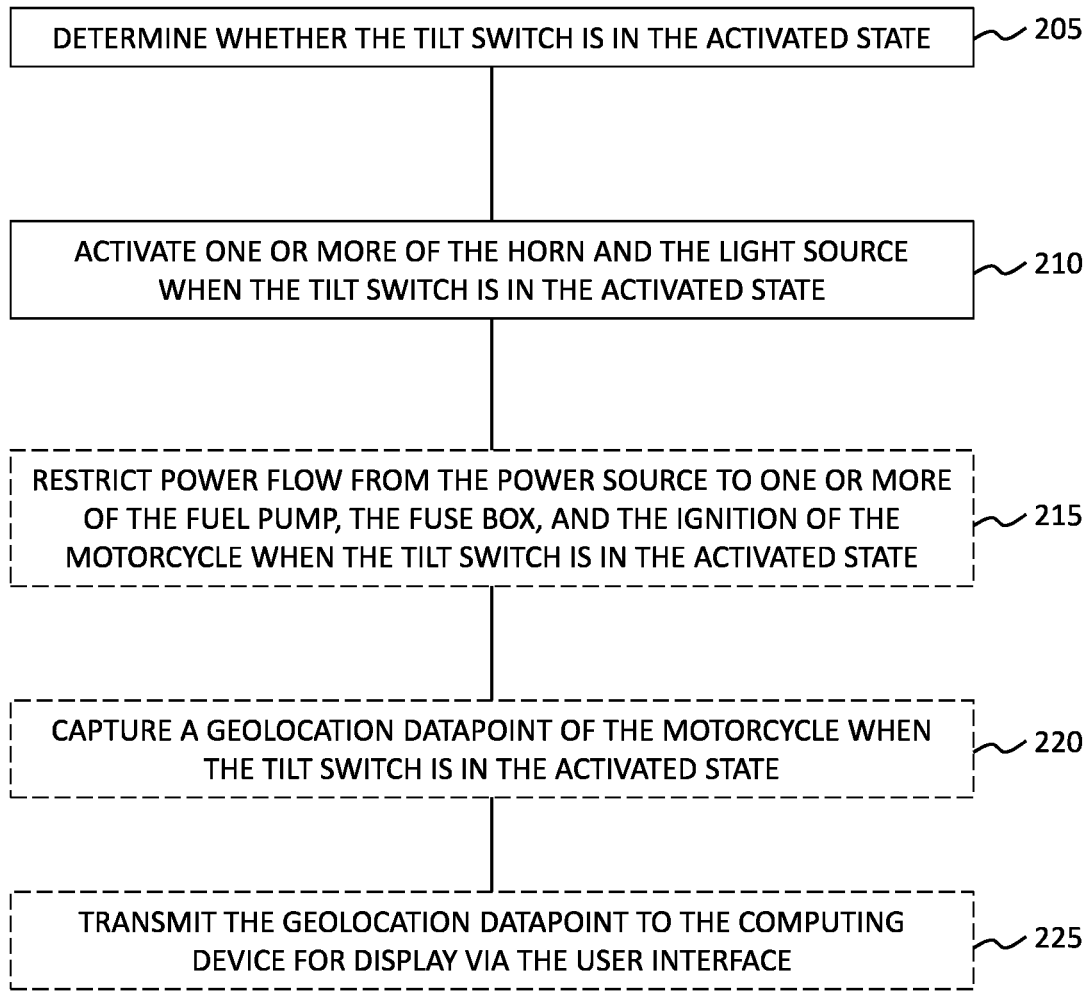
FIG. 2 is a flowchart depicting operational steps of a motorcycle theft prevention device, according to other embodiments.
Figure 3:
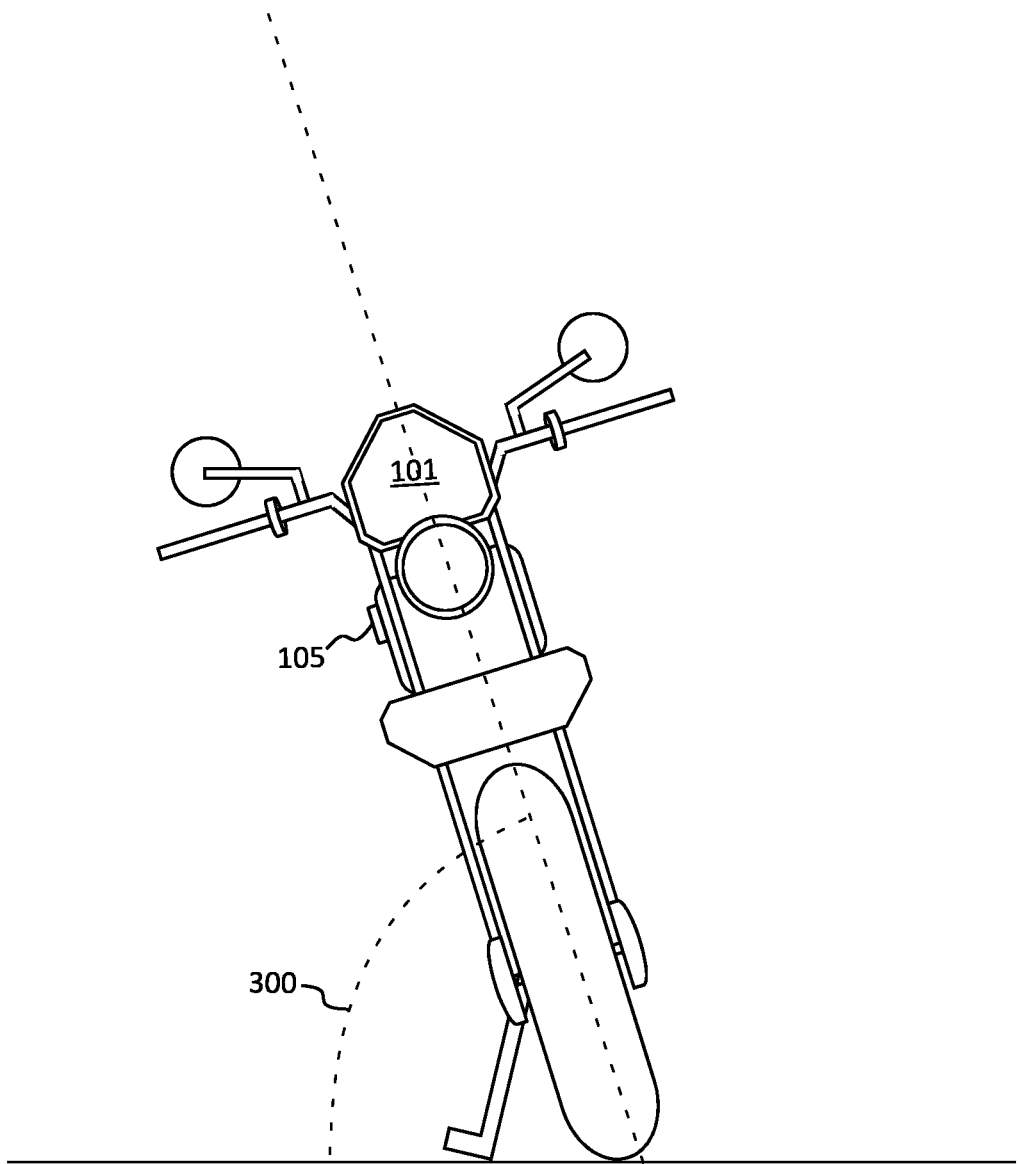
FIG. 3 illustrates a motorcycle oriented at a resting angle, according to certain embodiments.
Figure 4:
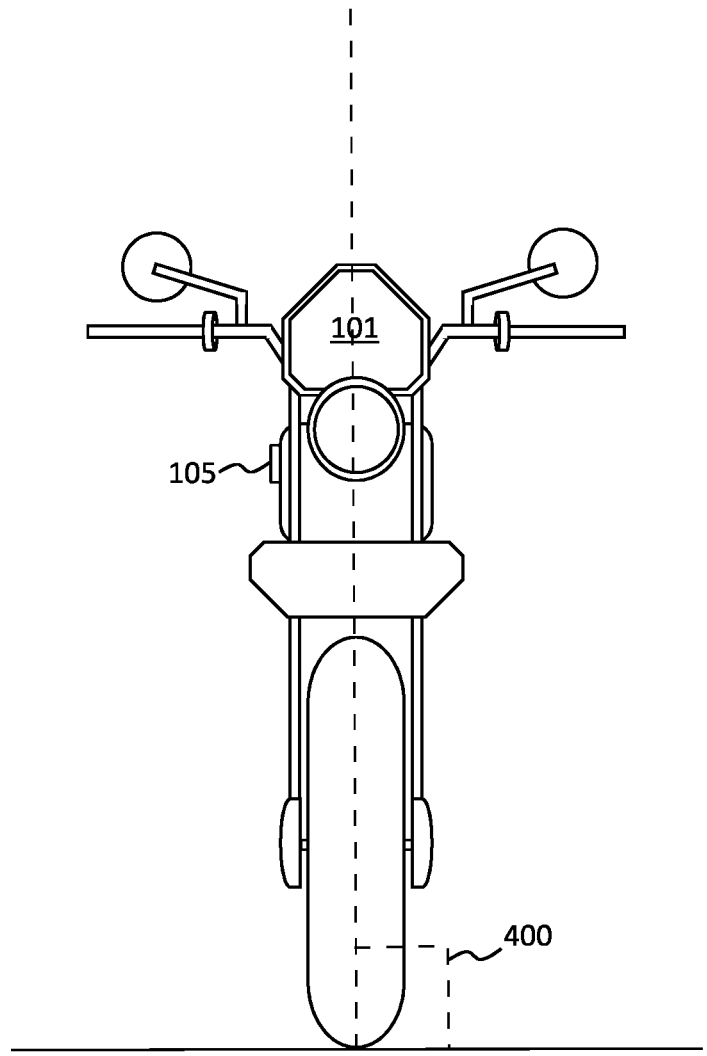
FIG. 4 illustrates the motorcycle of FIG. 3 oriented at an active angle, according to yet still other embodiment.

FIG. 2 is a flowchart depicting operational steps of the theft prevention 101, in accordance with certain embodiments. For example, similar to other theft prevention systems, the theft prevention system 105 can be activated by the user when they park the motorcycle 101 (i.e., when the user transitions the motorcycle 101 to the resting angle 300 the user can turn on the theft prevention system 105 using a power switch). At Step 205, whether the tilt switch 115 is in the activated state is determined. At Step 210, one or more of the horn 106 and the light source 107 are activated when the tilt switch 115 is in the activated state. For example, if the motorcycle 101 is oriented in the active angle 400, the tilt switch 115 senses the orientation and transitions to the activated state. At Step 215, power flow from the power source 108 to one or more of the fuel pump 102, the fuse box 103, and the ignition 104 of the motorcycle 101 is restricted when the tilt switch 115 is in the activated state. For example, operation of the motorcycle 101 is frustrated when power flow from the power source 108 to one or more of the fuel pump 102, the fuse box 103, and the ignition 104 of the motorcycle 101 is restricted.

At Step 220, a geolocation datapoint(s) of the motorcycle 101 are captured when the tilt switch 115 is in the activated state. The user can use the geolocation datapoints to locate the vehicle for retrieval. For example, the communications device 120 can be used to transmit location datapoints to the computing device 150 in real-time (i.e., as the data is generated or a duration imperceptible by humans). At Step 225, the geolocation datapoint is transmitted, via the communications device 120, to the computing device 150 for display via the user interface 150. For example, the geolocation datapoints can be depicted on a map and displayed via the user interface 150.

Figure 5:
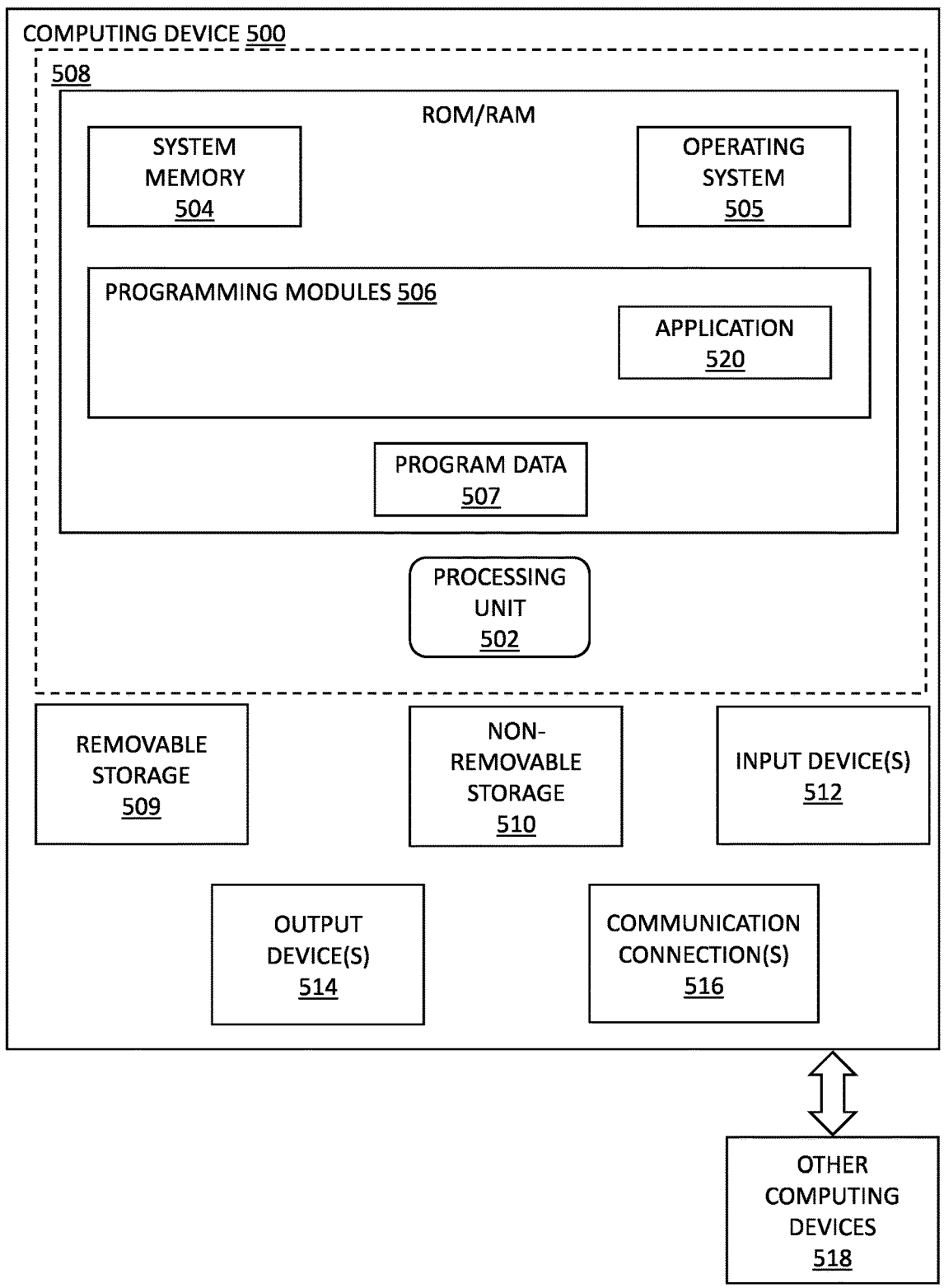
FIG. 5 depicts a block diagram of components of the motorcycle theft prevention device, according to some embodiments.

With reference to FIG. 5, a system consistent with an embodiment of the disclosure may include a computing device or cloud service, such as computing device 500. Computing device 500 can represent the theft prevention system 105 and/or the computing device 150. In a basic configuration, computing device 500 may include at least one processing unit 502 (e.g., control circuit 110) and a system memory 504. Depending on the configuration and type of computing device, system memory 504 may comprise, but is not limited to, volatile (e.g., random-access memory (RAM)), non-volatile (e.g., read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include machine learning module. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable, and non-removable media implemented in any method or technology for storage of information, such as computer-readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 500. Any such computer storage media may be part of device 500. Computing device 500 may also have input device(s) 512 such as a keyboard, a mouse, a pen, a sound input device, a touch input device, a location sensor, a camera, a biometric sensor, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 (e.g., control circuit 110), programming modules 506 (e.g., application 520 such as a media player) may perform processes including, for example, one or more stages of methods, algorithms, systems, applications, servers, databases as described above. The aforementioned process is an example, and processing unit 502 (e.g., control circuit 110) may perform other processes. Other programming modules that may be used in accordance with embodiments of the present disclosure may include machine learning application.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

What is claimed is:
1. A motorcycle alarm system, comprising:
a housing including:
 a tilt switch;
 a control circuit;
 an on/off power switch;
 a communications device;
 a geolocation device;
 an alarm power source;
wherein
 the housing is space-efficiently sized to house the tilt switch, the control circuit, the communications device, the geolocation device, and the alarm power source;
 the housing is configured to be retrofittable affixed to a motorcycle;
 the housing is externally affixed to the motorcycle;
 the on/off power switch is positioned on an external surface of the housing;
 the motorcycle includes:
  a horn;
  a light source;
  a vehicle power source;
  a fuel pump;
  a fuse box;
  an ignition;
 an active angle of the motorcycle is greater than a resting angle of the motorcycle, wherein the active angle is 90 degrees in relation to a ground, and wherein the resting angle is 45 degrees in relation to the ground;
 the control circuit is communicatively coupled to the tilt switch, the on/off power switch, the horn, the light source, the vehicle power source, the communications device, the geolocation device, and the alarm power source;

the control circuit is electrically connected to the fuel pump, the fuse box, and the ignition through at least one jumper cable;

the at least one jumper cable traversing out of the housing and into the motorcycle;

the tilt switch is a mercury switch;

the tilt switch is configured to be in a deactivated state when the motorcycle is oriented in the resting angle as the motorcycle leans against the kickstand;

the tilt switch is configured to be in an activated state when the motorcycle is oriented in the active angle as the motorcycle is upright in motion;

the control circuit is configured to:
  receive, via the communication device, an alarm arming instruction from a wireless remote;
  determine whether the tilt switch is in the activated state;
  activate one or more of the horn and the light source when the tilt switch is in the activated state;
  restrict power flow from the vehicle power source to one or more of the fuel pump, the fuse box, and the ignition of the motorcycle when the tilt switch is in the activated state;
  receive, via the communications device, other operational instructions from a computing device, wherein the computing device is a mobile computing device, and wherein the mobile computing device comprises a user interface;
  capture, via the geolocation device, a geolocation datapoint of the motorcycle when the tilt switch is in the activated state; and
  transmit, via the communications device, the geolocation datapoint to the mobile computing device; and the computing device is configured to display the geolocation datapoint on a virtual map through the user interface.

\* \* \* \* \*